Figure 2:
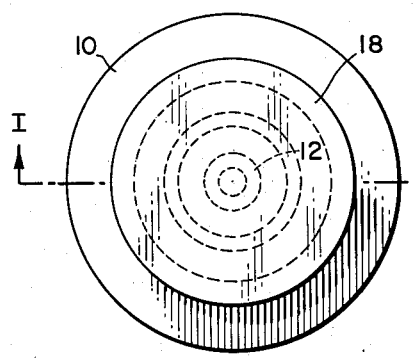

April 3, 1962 G. W. COON 3,027,769
DIAPHRAGM TYPE CAPACITANCE TRANSDUCER
Filed March 3, 1959 2 Sheets-Sheet 1

TO SOURCE OF
REFERENCE PRESSURE

INVENTOR.
GRANT W. COON
BY
ATTORNEYS

April 3, 1962          G. W. COON          3,027,769
DIAPHRAGM TYPE CAPACITANCE TRANSDUCER
Filed March 3, 1959          2 Sheets-Sheet 2

INVENTOR.
GRANT W. COON
BY
ATTORNEYS

United States Patent Office 3,027,769
Patented Apr. 3, 1962

3,027,769
DIAPHRAGM TYPE CAPACITANCE TRANSDUCER
Grant W. Coon, 1119 Hopkins Ave., Palo Alto, Calif.
(% NASA-Moffett Field, Calif.)
Filed Mar. 3, 1959, Ser. No. 796,994
8 Claims. (Cl. 73—398)
(Granted under Title 35, U.S. Code (1952), sec. 266)

The invention described herein may be used by or for the Government of the United States of America for governmental purposes without the payment of any royalties thereon or therefor.

The present invention relates to pressure transducers. More specifically, it relates to a force-measuring or sensing device which is especially suitable for use as a survey probe in the dynamic testing of aircraft and missile components.

In aeronautical design, a determination of the forces and moments acting upon a model of an airframe is normally obtained by measuring the forces required to prevent translation and/or rotation of the model. Such static measurements can be carried out with a relatively high degree of accuracy by piston-actuated transducers incorporating a rather massive cantilevered beam the bending of which causes a change in the electrical characteristics of one or more strain gauges carried thereby.

The acquisition of dynamic pressure information, however, frequently involves separate measurements at several different points on the model. This is true, for example, in shock-tube tunnel research, where it is desirable to ascertain the frequency and magnitude of pressure fluctuations in the boundary-layer flow.

The physical geometry of the transducers in an environment of this nature should be such as to introduce a minimum disturbance into the air stream. Furthermore, units of the type under discussion should be relatively insensitive to the wide variations in temperature normally encountered during a testing cycle, and, in addition, should possess adequate frequency-response characteristics.

It has been proposed to effect such measurements by a flush-diaphragm type of transducer in which a displacement of the pressure-sensitive element is measured by a single active strain gauge mounted on the outer surface of the diaphragm. An assembly of this type may have satisfactory physical dimensions, but large temperature effects are produced due to the presence of but a single strain gauge and the consequent lack of electrical balance. Furthermore, thermal warpage of the diaphragm, produced not only by heat from the strain gauge but also by the changing ambient temperature, frequently results in large output errors. Still further, unbonded strain gauges, which are generally employed in constructions of this type, are easily damaged by high pressure overloads, and, since damping is of necessity quite low, rapid pressure changes may cause the diaphragm to resonate and thus completely obscure the signal variations. It is possible to minimize the temperature effects by mounting the strain gauge on the inner surface of the daiphragm and hence out of direct contact with the air stream, but this expedient may increase the size of the transducer assembly to a prohibitive degree.

The inherent limitations not only of strain gauges but also of inductance, resistance-potentiometer, and piezoelectric pressure cells for dynamic measurements have resulted in proposals to employ capacitance-type transducers for this purpose. Two basic advantages are attained from use of such a design, (1) the mechanical construction of the unit can be made considerably less complex than that of other forms of pressure cells, and (2) the electrical heat generated within the cell body is generally lower.

Although capacity transducers are relatively rugged and not not require any moving element for sensing other than the diaphragm, a number of difficulties have been experienced in securing reliable operation. Conventionally, such transducers are operated at the end of a cable which leads to the associated electrical equipment. Each such transducer employs a transformer or amplifier in the same housing as the cell in order to overcome the effect of cable capacity on stability of the output signal. This undesirably increases the over-all size of the transducer, and, furthermore, places temperature-sensitive components within the cell body.

The matter of zero drift in response to temperature changes is also extremely important when high-frequency pressure variations are to be measured, since in such cases the cell diaphragms are very "stiff" and designed for pressure-induced movements of as little as $\frac{1}{100,000}$ of an inch. Temperature changes can result in diaphragm deflections of comparable magnitude, rendering signal interpretation difficult or impossible. Still further, capacitance-type pressure cells are usually assembled from parts bolted or pressed together, resulting in dimensional variations beyond acceptable limits.

In accordance with a feature of the present invention, a capacitance-type pressure cell is provided which combines small size with high sensitivity and rugged construction. Furthermore, all of the elements of the transducer herein set forth are fused or welded together, thus precluding any change in the relative position of the two capacitor plates due to slippage or displacement of parts. By utilizing a thin conducting film for a stationary electrode on a support which is anchored to the cell walls in close proximity to the diaphragm and by utilizing components having low, matched coefficients of expansion, motion within the cell due to temperature changes becomes negligible. Complete electrical shielding of the transducer both internally and externally eliminates not only the effect of outside electromagnetic disturbances but also the possibility that relative motion between the inner conductor and the cell housing will be introduced as a capacitance variation into the output signal.

Unlike piezoelectric transducers, those of the present invention are suitable for accurate measurement of low-frequency or static pressures as well as those which undergo rapid changes. The disclosed transducers are simple and inexpensive to manufacture in sizes as small as .1 inch in diameter and .1 inch in depth. Not only are they relatively insensitive to temperature changes, with very small zero drifts, but they display minor acceleration errors and are capable of withstanding extreme overloads for extended periods of time without structural damage.

One object of the present invention, therefore, is to provide an improved transducer of the capacitance type.

A further object of the invention is to provide a sensitive capacitance transducer of small size and rugged construction.

An additional object of the invention is to provide a force-sensing unit designed to measure both static and dynamic pressure variations with a high degree of accuracy and freedom from temperature-induced instabilities.

Figure 1:
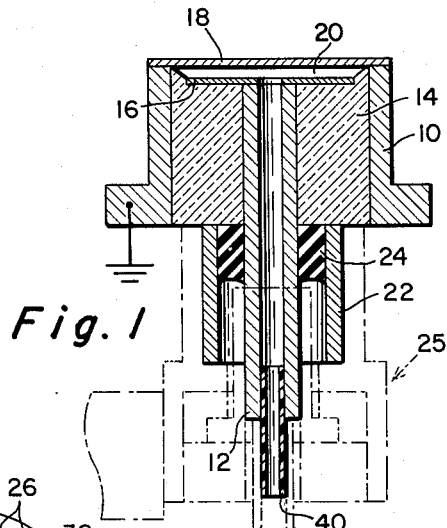
Figure 4:
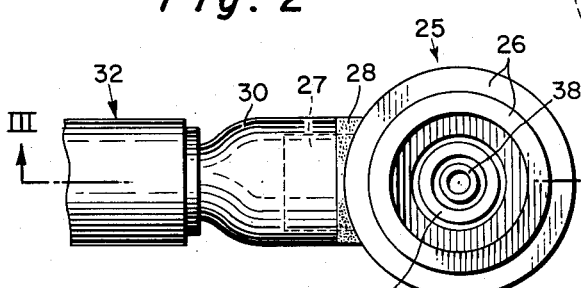
Figure 3:
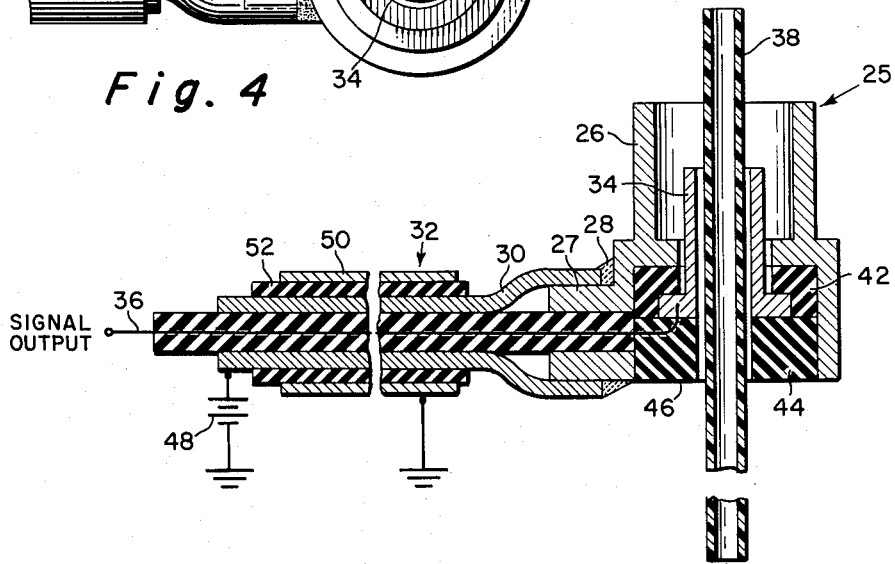
Figure 5:
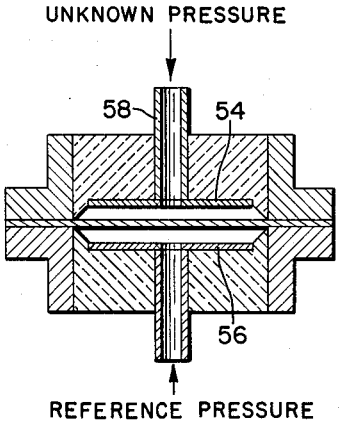
Figure 6:
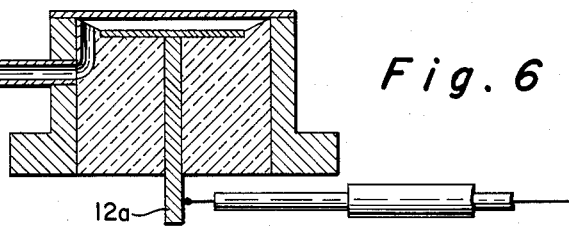
Figure 7:
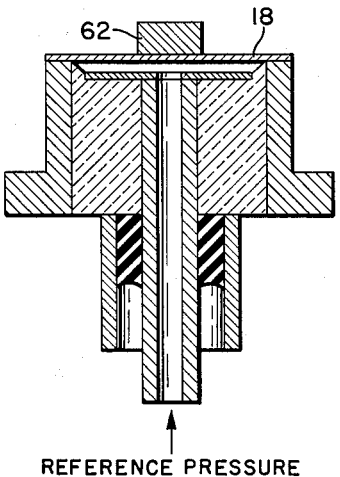

Other objects and many of the attendant advantages of this invention will be readily appreciated as the same becomes better understood by reference to the following detailed description when considered in connection with the accompanying drawings wherein:

FIGS. 1 and 2 are cross-sectional and top views, respectively, of a transducer designed in accordance with the principles of the present invention, further showing in dotted outline a preferred form of adapter designed for use therewith;

FIGS. 3 and 4 are cross-sectional and top views, respectively, of the adapter shown in dotted outline in FIG. 1; and FIGS. 5 through 7 are cross-sectional views showing modifications of the pressure cell of FIGS. 1 and 2.

Referring now to the embodiment of the invention illustrated in FIGS. 1 and 2, a transducer unit is shown which comprises a generally tubular shell or body 10 composed of metallic material such as nickel steel, and having, in one preferred construction, an outside diameter as small as .12 inch. A conductive tube 12, also preferably of metal, is centrally positioned within body member 10 so as to be coaxial therewith. Filling the space between the outer surface of tube 12 and the inner wall of body 10 is a solid insulating substance 14 such as glass or a ceramic, this substance, in a preferred form of construction, being hermetically sealed by firing to the metal members 10 and 12.

As shown in FIG. 1, the upper end of tube 12 lies flush with the flat upper surface of the insulating substance 14. The latter is provided with a conductive metallic film 16, preferably produced by painting the insulation surface with gold chloride and then firing the assembly. The conductive film contacts, and may at least partially overlie, the end of tube 12, but is out of electrical engagement with the shell or body member 10. As will later appear, this conductive film 16 forms the stationary, or fixed, electrode of the capacitor-transducer unit, and as formed has an aperture coextensive with the open end of tube 12.

From the drawing it will be seen that the conductive film 16 is recessed below the rim level of shell 10 by an amount which, in one example, is between .001 inch and .003 inch. A pressure-responsive diaphragm 18, formed of a material such as nickel steel, or one which has essentially the same coefficient of linear expansion as that of the body member 10, is welded around the rim of the latter so as to leave an air gap 20 between the diaphragm and the conductive film 16. The air gap 20 allows for flexing of diaphragm 18, which, as will now be apparent, constitutes the movable electrode of the capacitor-transducer unit. In one design which has proved to be satisfactory in practice, the diaphragm 18 has a thickness of as little as 0.00025 inch, yielding full-scale outputs to pressure as low as ±0.03 p.s.i. for cells of ¼-inch size.

It is of great importance to provide complete electrical shielding for the transducer, both from the standpoint of excluding interference which originates outside the assembly as well as to prevent signal variations due to capacity changes resulting from relative movement between various portions of the cell body and between the electrical connections thereto. Consequently, a tubular shield 22 extends downwardly (in the drawing) from the insulating member 14 and lies so as to be coaxial both with the inner tube 12 and with the shell 10. Within the tubular shield 22 is an insulator 24 which may be a ring of plastic material having high dielectric properties. Shield 22 is designed to contact one portion of an adapter, shown in dotted outline and identified by the reference numeral 25, which provides electrical connections from a lead-in cable to the transducer and also facilitates the conveyance of a reference fluid under predetermined pressure through the tube 12 to fill the space between the stationary and movable capacitor electrodes 16 and 18, respectively.

The details of adapter 25 are illustrated in FIGS. 3 and 4. The unit consists of a generally tubular outer body member 26, of electrically conductive material, and provided with a radial extension 27 which permits connection thereto (as by soldering at 28) of the inner shield 30 of a triaxial cable 32. Nestled within the body member 26 of the connector, but out of electrical engageemnt therewith, is a generally tubular insert 34 to which is affixed, by soldering or otherwise, the inner conductor 36 of the triaxial cable 32. A flexible tube 38, which may be of plastic, extends through the insert 34 and leads to a source of reference pressure (not shown). Tube 12 of FIG. 1 is provided with an extension 40 of reduced diameter over which the flexible tube 38 of FIG. 3 is slipped when the adapter is brought into operative relation with the transducer, the tube 38 being loosely carried within the insert 34 so as to have freedom of longitudinal movement with erspect thereto.

The insert 34 is positioned relative to the adapter body 26 by an insulator 42 and by a further insulating substance 44 which may be formed from a suitable liquid potting compound. A coating 46 of conductive material such as silver paint may be employed on the outer surface of the insulating substance 44, forming electrical contact with the adapter body 26 and with the inner shield 30 of the cable 32.

The inner shield 30 of the triaxial cable 32 is maintained at a constant D.-C. potential by means of the battery or other source 48. The outer shield 50 of the cable is grounded as shown, the two cable shields 30 and 50 being separated by a layer 52 of suitable insulation.

When the adapter of FIGS. 3 and 4 is first connected to the transducer of FIGS. 1 and 2, the flexible tube 38 of the adapter slips over the extending portion 40 of the transducer stem 12. This establishes a conduit for conveying fluid to the inner surface of the diaphragm 18 from a suitable source of known pressure characteristics. As the two assemblies are brought into closer proximity, the insert 34 of the adapter makes a sliding fit with the tube 12, the former acting as a sleeve for the latter. This electrically connects the stationary electrode 16 of the capacitor to the central conductor 36 of the triaxial cable 32. In addition, the inner shield 30 of the cable (which is soldered to the adapter shell 26) makes electrical contact with the tubular shield 22 of the pressure cell through a sliding fit between the members 22 and 26. This sliding fit is terminated when the top (in the drawing) of the adapter shell 26 makes physical contact with the lower surface of the insulating substance 14 which fills the interior of the transducer unit, the two units then having the relative position shown in FIG. 1. However, the member 26 does not enter into electrical engagement with the transducer body member 10. A result of the above association is to place the shield 22 at the D.-C. potential of the battery 48.

To complete the electrical circuit for the capacitor, the shell 10 of the transducer is grounded to correspondingly ground the diaphragm 18. The outer shield 50 of the triaxial cable 32 is also grounded as shown. The output of the transducer may be measured by more or less conventional bridge circuits which have a sensitivity adequate to detect capacitance changes as small as one times 10 to the minus 15th power farads ($1 \times 10^{-15}$ farads). It is also desirable that these measuring circuits have full electrostatic shielding.

A preferred method of constructing the transducer unit is to machine one side of the feed-through by grinding, so that the center electrode 12 and essentially all of the insulator 14 are recessed below the rim level of the shell 10 by approximately .003 inch. The conductive gold film is painted over the recessed portion of the insulator (including the end surface of the center electrode) and the unit is baked. The diaphragm 18 is prepared by stretching a piece of material, of larger diameter than the cell, in a fixture which gives a desired uniform radial tension to the diaphragm. This tension is selected in accordance with the diaphragm's natural frequency of vibration, since this characteristic is related mathematically to stress for diaphragms of given diameter, thickness, and compositon. The natural frequency of the diaphragm is meaured by exciting the diaphragm with a small loudspeaker driven by an audiofrequency generator. When the tone of the speaker and the natural frequency of the diaphragm are identical, a maximum deflection of the diaphragm will occur, and this may be indicated by a meter or displayed on an oscilloscope connected to an inductive or capacitative pickup located in the vicinity of the diaphragm.

When the daiphragm is mounted in the stretcher at proper tension, it is placed adjacent to the transducer body 10 (which is held in the jig of a capacitance-discharge spot welder) and the diaphragm is welded to the rim of the shell 10 at a plurality of overlapping spots around its periphery. Distortion from local heating, as well as local burning of the diaphragm material, is reduced by the addition of a small droplet of water under the spot-weld electrode. The result is a pressure cell with zero leakage between the diaphragm and the body, even after extentive life tests of tens of millions of pressure cycles at 3 times full-scale amplitude. By comparison, such tests resulted in failure of conventional soldered-cell constructions after only a few seconds of operation.

One of the features of transducers constructed in accordance with the teaching of the present invention is that temperature effects are minimized. This is due in large measure to (1) the extreme thinness of the stationary plate and to the anchoring of its support at close proximity to the periphery of the diaphragm, (2) to the low coefficient of linear expansion of the material from which the cell body 10 is constructed (42% nickel steel is a good example, which has an expansion coefficient about one-third that of cold rolled steel), (3) the low coefficient of expansion of the material from which the insulating member 14 is formed (1075 glass, or Kovar-Sealing glass, is preferred, the expansion coefficient of which closely matches that of 42% nickel steel), and (4) the thinness of the metallic film which forms the fixed electrode, as well as the over-all reduced dimensions of the cell assembly itself.

An optional feature which may be incorporated in a pressure cell of the type herein disclosed is the addition of an insulating coating over the metallic film 16, such coating being, for example, of low-melting-point glass. The presence of such a coating may in some cases preclude electrical shorting between the capacitor plates during extreme pressure overloads. A coating of this nature performs the further function of increasing cell sensitivity, since the coating has a higher voltage breakdown than air and hence allows a higher voltage to be used and/or a closer spacing between the electrodes. A still further increase in transducer sensitivity may be obtained by replacing this glass coating with one of high dielectric constant, such as titanium dioxide, the space occupied by this material being equivalent electrically to an air space many times as thick. If such a cell construction is desired, it may be obtained by coating the insulating member 14 with titanium and then anodizing part way therethrough, the depth of penetration being a function of the anodizing voltage.

With reference to the operation of the transducer, it has previously been stated that the purpose of the shield assembly 22, 26, 30 is to prevent any relative motion of the inner conductor 36 with respect to the outer cable shield 50 (or cell housing 10) from appearing as a capacitance change to the transducer and hence affecting the measuring circuit. The battery 48 should be such that this inner shield assembly is at a potential approximating that of the inner cable conductor 36 and hence the stationary capacitor plate 16. This minimizes current flow from conductor 36 to the inner shield assembly. Further, the capacitance of the central conductor 36 to the inner shield assembly should be so introduced into the external measuring circuit that what ever current does flow through this capacitance does not appear across the output terminals of the transducer and hence does not affect the pressure measurements obtained.

Two modifications of the present invention are set forth in FIGS. 5 and 6, respectively. FIG. 5 illustrates a double-ended transducer which possesses increased sensitivity and linearity due to the presence of two fixed electrodes 54 and 56 rather than the single electrode 16 of FIGS. 1 and 2. However, this form of cell has narrower frequency limits because of the restricted fluid path to the diaphragm through the tube 58. Such restriction limits the acoustical response characteristics of the pressure cell. The constructional features of each section are generally similar to those of the single-ended transducer described above.

The showing of FIG. 6 is similar to that of FIG. 1, except that the reference pressure enters the cell laterally through a tube 60 rather than being conveyed through the electrically-conductive tube 12 of FIGS. 1 and 2 which extends normal to the respective planes of the capacitor electrodes. The construction of FIG. 6 is especially useful in situations where pressures are to be measured on very thin airfoil models. The central conductor 12a in FIG. 6 serves only in an electrical capacity, and hence may be considerably smaller in diameter than the fluid-conducting tube 12 of FIGS. 1 and 2 since the latter performs a dual function.

The pressure-measuring device of the present invention may readily be converted, as indicated by FIG. 7, into a linear accelerometer for measuring accelerating forces parallel to its longitudinal axis. The only change necessary in the structure of FIGS. 1 and 2 is the attachment of a member 62 of high specific gravity to the outer surface of the diaphragm 18.

Obviously many modifications and variations of the present invention are possible in the light of the above teachings. It is therefore to be understood that within the scope of the appended claims the invention may be practiced otherwise than as specifically described.

I claim:

1. A force-responsive device of the capacitance type comprising: a housing of generally tubular configuration, said housing being composed of electrically-conductive material having a predetermined thermal coefficient of expansion; a diaphragm enclosing one end of said tubular housing, said diaphragm being composed of electrically-conductive material having a thermal coefficient of expansion which is essentially equal to that of said housing and being securely affixed to the latter around one rim thereof; an insulator partially filling said housing and having an essentially planar inner surface which is spaced apart from the inner surface of said diaphragm, said insulator having a thermal coefficient of expansion which is essentially similar both to that of said housing and to that of said diaphragm; a coating of electrically-conductive material on the inner surface of said insulator but out of electrical engagement with said housing, said electrically-conductive coating lying in spaced-apart parallel relation to said diaphragm and forming, with the latter, the two electrodes of an electrical capacitor; an elongated electrical conductor extending through said insulator in coaxial relationship with said housing, the inner end of said elongated conductor lying essentially flush with the electrically-conductive surface on said insulator and being in electrical engagement with such conductive surface; means for conveying fluid to and from the space between said diaphragm and said electrically-conductive coating; and electrical connections to said housing and to said elongated conductor, respectively.

2. A pressure-responsive device according to claim 1, in which the conductive coating on said insulator is in the form of a metallic film.

3. A pressure-responsive device according to claim 2, further comprising a coating of electrically-insulating material overlying said metallic film between the latter and said diaphragm.

4. A pressure-responsive device according to claim 3, in which said insulating coating is of a ceramic nature.

5. A pressure-responsive device according to claim 3, in which said insulating coating is an anodized metallic film.

6. A pressure-responsive device of the capacitance type comprising: a first housing of generally tubular configuration, said first housing being composed of electrically-conductive material having a predetermined thermal coefficient of expansion; a diaphragm enclosing one end of said first housing, said diaphragm being composed of electrically-conductive material having a thermal coefficient of expansion which is essentially equal to that of said housing and being securely affixed to the latter around one rim thereof; a first insulator partially filling said housing and having an essentially planar inner surface which is spaced apart from the inner surface of said diaphragm, said insulator having a thermal coefficient of expansion which is essentially similar both to that of said housing and to that of said diaphragm; a first coating of electrically-conductive material on the inner surface of said insulator but out of electrical engagement with said housing, said electrically-conductive coating lying in spaced-apart parallel relation to said diaphragm; a first elongated electrical conductor extending through said insulator in coaxial relationship with said housing, the inner end of said elongated conductor lying essentially flush with the electrically-conductive surface on said insulator and being in electrical engagement with such conductive surface; a second housing coaxially positioned with respect to said first housing and lying on the opposite side of said diaphragm therefrom; said second housing being composed of an electrically-conductive material having a thermal coefficient of expansion essentially similar to that of said first housing, said second housing being securely affixed to said diaphragm around the rim thereof in a manner similar to that of said first housing; a second insulator at least partially filling said housing, said second insulator having a thermal coefficient of expansion essentially similar to that of said first insulator; a second coating of electrically-conductive material on the inner surface of said second insulator but out of electrical engagement with said housing, the said second electrically-conductive coating lying in spaced-apart parallel relation to said diaphragm; a second elongated electrical conductor extending through said second insulator in coaxial relation with said second housing, the inner end of said second conductor lying essentially flush with the said second electrically-conductive coating and being in electrical engagement with such conductive surface; whereby said diaphragm constitutes one electrode of an electrical capacitor, and said first and second electrically conductive coatings together form the remaining electrode, each of said elongated conductors being of a hollow tubular nature and adapted to convey fluid to and from the chambers lying between said diaphragm and said first and second electrically-conductive coatings, respectively.

7. A transducer of the capacitance type comprising: a housing of generally tubular configuration, said housing being composed of electrically-conductive material having a predetermined thermal coefficient of expansion; a diaphragm enclosing one end of said tubular housing, said diaphragm being composed of electrically-conductive material having a thermal coefficient of expansion which is essentially equal to that of said housing and being securely affixed to the latter around one rim thereof; an insulator partially filling said housing and having an essentially planar inner surface which is spaced apart from the inner surface of said diaphragm, said insulator having a thermal coefficient of expansion which is essentially similar both to that of said housing and to that of said diaphragm; a coating of electrically-conductive material on the inner surface of said insulator but out of electrical engagement of said housing, said electrically-conductive coating lying in spaced-apart parallel relation with said diaphragm and forming, with the latter, the two electrodes of an electrical capacitor; an elongated electrical conductor extending through said insulator in coaxial relationship with said housing, the inner end of said elongated conductor lying essentially flush with the electrically-conductive surface on said insulator and being in electrical engagement with such conductive surface; electrical connections to said housing and to said elongated conductor, respectively; and means, independent of said elongated electrical conductor, for conveying fluid to and from the space between said conductive coating and said diaphragm.

8. A linear accelerometer of the capacitance type comprising: a housing of generally tubular configuration, said housing being composed of electrically-conductive material having a predetermined thermal coefficient of expansion; a diaphragm enclosing one end of said tubular housing, said diaphragm being composed of electrically-conductive material having a thermal coefficient of expansion which is essentially equal to that of said housing and being securely affixed to the latter around one rim thereof; an insulator partially filling said housing and having an essentially planar inner surface which is spaced apart from the inner surface of said diaphragm, said insulator having a thermal coefficient of expansion which is essentially similar both to that of said housing and to that of said diaphragm; a coating of electrically-conductive material on the inner surface of said insulator but out of electrical engagement with said housing, said electrically-conductive coating lying in spaced-apart parallel relation to said diaphragm and forming, with the latter, the two electrodes of an electrical capacitor; an elongated hollow, tubular electrical conductor extending through said insulator in coaxial relationship with said housing, the inner end of said elongated conductor lying essentially flush with the electrically-conductive surface on said insulator and being in electrical engagement with such conductive surface, said hollow tubular electrical conductor being adapted to convey fluid to and from the space between said diaphragm and said electrically-conductive coating; electrical connections to said housing and to said elongated conductor, respectively; and a member of high specific gravity supported on said diaphragm.

References Cited in the file of this patent

UNITED STATES PATENTS

| 1,796,150 | Hamer | Mar. 10, 1931 |
| 2,250,471 | De Bruin | July 29, 1941 |
| 2,345,071 | Reynst et al. | Mar. 28, 1944 |
| 2,869,851 | Sedgfield | Jan. 20, 1959 |
| 2,907,320 | De Weese et al. | Oct. 6, 1959 |